Feb. 16, 1932.  A. W. KOGSTROM  1,845,290
SHOCK ABSORBER
Filed Oct. 22, 1928    5 Sheets-Sheet 1

INVENTOR
Axel W. Kogstrom
BY
Harness, Dickey & Pierce
ATTORNEYS

Feb. 16, 1932.  A. W. KOGSTROM  1,845,290
SHOCK ABSORBER
Filed Oct. 22, 1928  5 Sheets-Sheet 2

Inventor
Axel W. Kogstrom
By Harness, Dickey & Pierce
Attorneys

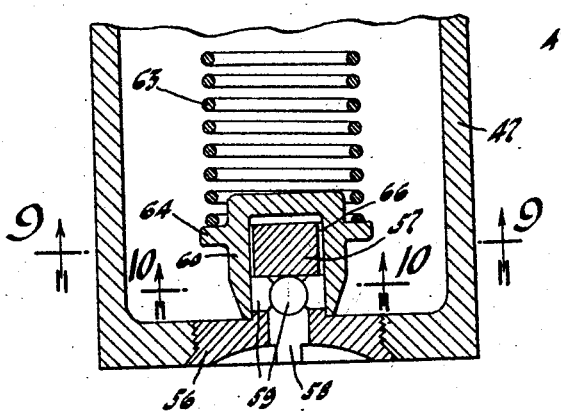
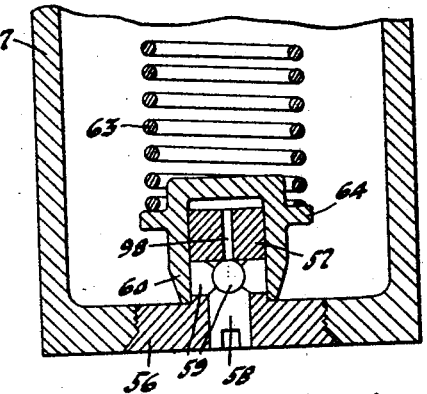
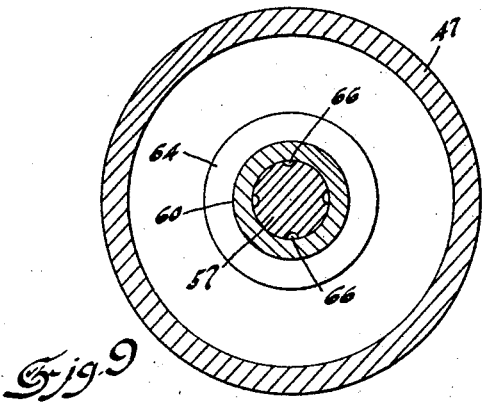
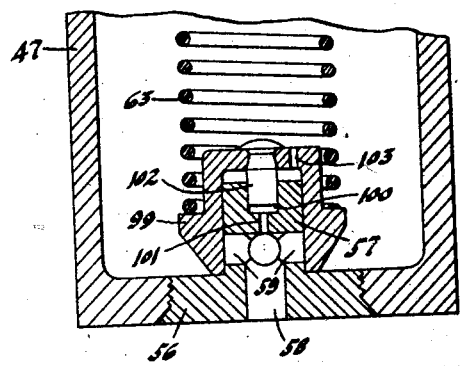
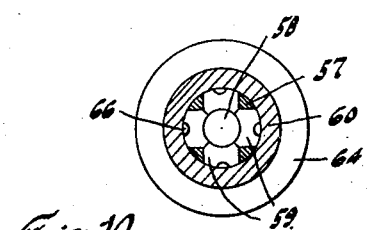

Feb. 16, 1932.  A. W. KOGSTROM  1,845,290
SHOCK ABSORBER
Filed Oct. 22, 1928    5 Sheets-Sheet 4

INVENTOR
Axel W Kogstrom
BY
Harness, Dickey & Pierce
ATTORNEYS

Feb. 16, 1932.  A. W. KOGSTROM  1,845,290
SHOCK ABSORBER
Filed Oct. 22, 1928    5 Sheets-Sheet 5

INVENTOR.
Axel W. Kogstrom
BY
Harness, Dickey & Pierce
ATTORNEYS

Patented Feb. 16, 1932

1,845,290

UNITED STATES PATENT OFFICE

AXEL W. KOGSTROM, OF DETROIT, MICHIGAN, ASSIGNOR TO LEIGHTON DUNNING, OF DETROIT, MICHIGAN

SHOCK ABSORBER

Application filed October 22, 1928. Serial No. 314,003.

This invention pertains to improvements in hydraulic shock absorbers and the general object of the invention is to provide a means for producing a more effective control of the relative movements of the body and axle members of a vehicle.

Another object is to provide a hydraulic shock absorber of relatively cheap construction and long life, the resistance of which remains substantially unchanged when the viscosity of the working liquid changes.

Another object is to provide a hydraulic shock absorber for a motor vehicle in which the effective controlling resistance is maintained at a substantially predetermined value at any point in the movement of the parts thereof, and in which the resistance is independent of the variations in the relative velocity of the body and axle members of the vehicle.

Another object is to provide a novel means by which the pressure in the working cylinder of a hydraulic shock absorber is caused to remain at a substantially predetermined value during the working stroke of a piston and is unaffected by changes in the viscosity in the liquid or by the velocity of piston movement.

Another object is to provide a novel intake valve construction for a hydraulic shock absorber in which the leaking of the valve as a result of the pitting of the valve and valve seat is minimized.

Another object is to provide a cheap and novel means of supporting the inlet valve spring of a hydraulic shock absorber.

Another object is to provide a hydraulic shock absorber having a novel means for securing a piston actuating arm to a rock shaft affording a cheap construction and a tight connection which is particularly applicable to two way shock absorbers where the arm is first stressed in one direction and then in the other.

Another object is to provide a novel means for varying the pressure of the discharge valve spring of a hydraulic shock absorber in relation to the position of the actuating arm with respect to the casing.

Another object is to provide a shock absorber for a motor vehicle which will effectively dampen chattering of the vehicle axles when passing over a road having a "washboard" surface.

A further object is to afford a cheap and novel means for preventing an oscillating cylinder of a hydraulic shock absorber from moving from its seat during the suction stroke of the device.

The above being among the objects of the present invention the same consists in certain features of construction and combination of parts to be hereinafter described with reference to the accompanying drawings, and then claimed, having the above and other objects in view.

In the accompanying drawings which illustrate suitable embodiments of the present invention, and in which like numerals refer to like parts throughout the several different views,—

Fig. 8 is an enlarged fragmentary sectional view taken through the axis of the discharge valve shown in connection with the shock absorber shown in Figs. 2 and 3.

Fig. 9 is a sectional view taken on the line 9—9 of Fig. 8.

Fig. 10 is a sectional view taken on the line 10—10 of Fig. 8.

Fig. 11 is an enlarged sectional view of another form of discharge valve construction.

Fig. 12 is an enlarged sectional view of a third form of discharge valve construction.

Figure 1:
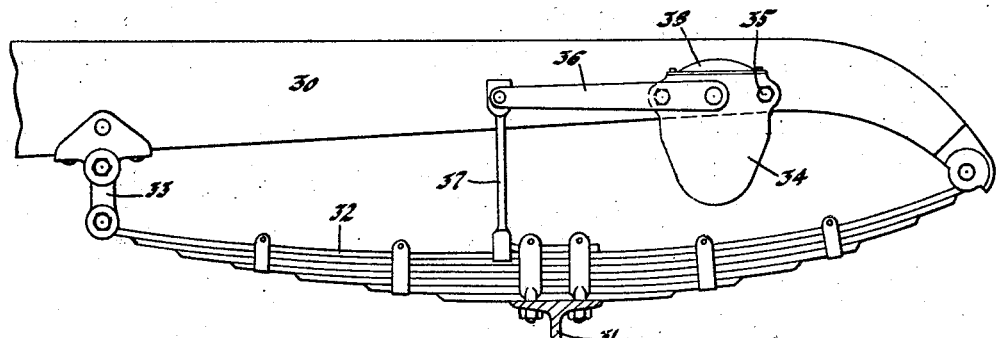
Fig. 1 is a side view of a preferred form of hydraulic shock absorber attached in a representative manner to the frame and axle of a motor vehicle.

In any vehicle, such as an automobile, which has springs interposed between the body and axles, the discomfort experienced by the occupants and the racking of the body are caused by unbalanced forces acting upon the body.

These unbalanced forces are the direct cause of accelerations or decelerations which are synonymous with riding discomfort. The unbalanced forces result from the vehicle springs being compressed or distended from their normal position as the vehicle passes over inequalities in the road. The extent to which the riding qualities of the vehicle may be improved by a shock absorber depends substantially upon its ability to oppose or neutralize the unbalanced spring forces in like proportion to their magnitude at any instant.

During certain relative movements of the axle and body it is impossible for the shock absorber to improve the riding comfort and in fact any resistance it may offer during these particular movements will detract therefrom, as the direction of the force applied by the shock absorber to the body could only be such as to add to the unbalanced force acting on the body.

For clearness in the description the complete cycle of vehicle spring action may be considered as divided into four phases. During the first phase of action when the car spring is being compressed from its normal position, its unbalanced force acts against the body in an upward direction and as any resistance offered by a shock absorber would be in such a direction as to add to the unbalanced spring force it follows that a shock absorber should offer no resistance during this action.

During the second phase of action the compressed spring recoils from the position assumed at the end of the first phase back to its normal position, and during this phase the unbalanced force of the spring is still in an upward direction as in phase one, but since the body and axle are moving away from each other it is possible for a shock absorber to impose a resistance which will be in the opposite direction to the unbalanced spring force. It, therefore, follows that during this second phase of action a shock absorber should oppose the relative movement of the car body and axle with a resistance which is at all times in proportion to the unbalanced spring force.

During the third phase of the action the axle and body are separating beyond their normal position, and the unbalanced force on the body is in a downward direction, and as any resistance during this phase of movement offered by a shock absorber would add to this unbalanced force it follows that a shock absorber should work freely during this third phase of the action.

During the fourth and last phase, which completes the cycle, when the distended spring is moving from the position assumed at the end of the third phase back toward its normal position, the unbalanced force on the body is still in a downward direction, as in phase three, but since the axle and body are approaching each other it is possible for a shock absorber to impose a resistance to this motion in such a direction as to oppose and tend to neutralize this unbalanced force. It, therefore, follows that during this fourth phase a shock absorber should resist this motion with a force which is proportional to the unbalanced force at each instant.

To summarize, in order to improve the riding of a vehicle to the fullest extent a shock absorber should not offer any resistance to the compression of the spring from its normal position but should resist the movement of the compressed spring back toward its normal position in a degree proportional to the unbalanced spring force acting upon the body at any instant, and it should not resist the motion during which the spring is distending from its normal position but during the return of the distended spring to its normal position it should offer a resistance to this movement which is opposite and in proportion to the downward unbalanced force acting on the body at any instant.

There is no discomfort in velocity as such; discomfort is the result of acceleration or deceleration and since the discomfort producing accelerations or decelerations in a motor vehicle are caused by the unbalanced spring forces and proportional thereto and independent of the velocity of movement at any instant, it therefore follows that the remedy, the resisting force of a shock absorber, should at each instant be in proportion to the unbalanced spring forces and should be unaffected by the velocity of the spring action.

One fault which is common to hydraulic shock absorbers to a greater or less extent is that the resistance they offer to the relative movements of body and axle is considerably greater in cold weather when the working liquid is more viscous than when the weather is warm and it, therefore, follows that if a shock absorber is not to be used in a climate where the temperature remains the same the year around it should have incorporated in its construction means for overcoming this objection.

Thus, since the discomfort is in proportion to the unbalanced spring force at any instant, and since the unbalanced spring force is purely a function of the position of the axle with respect to the body it follows that during the phases of its helpful action the magnitude of the resisting force of the shock absorber should be a substantially unvarying direct function of the position of the axle with respect to the frame at each instant and should be independent of the velocity of the action and should further be unaffected by temperature.

In defining the above cycle of operation of the shock absorber, the riding comfort has been the main consideration, and it would conform closely to the ideal if the unsprung weight (weight of axles, wheels, etc.) was negligible.

The unsprung weight, particularly in motor vehicles, is great enough to cause the axles, wheels, etc., to bounce up and down to an undesirable extent at times; the recoil of the resilient tire causing an upward throw of the wheel, compressing the vehicle spring, which in turn hurls the wheel against the road surface and compresses the tire, which again recoils and throws the wheel into the air. This is the objectionable action noticed as the axles "chatter" over a "washboard" road surface, or when the front axle gets into a high speed "tramp" or "shimmy". When axle "chattering", "tramping", or "shimmying" are taking place the oscillations are usually too rapid to cause appreciable disturbances to the relatively heavy vehicle body. There results, however, a lack of traction and attendant control of the vehicle, which introduces an element of danger. Although the amplitude of these oscillations is not usually very great, their dampening requires considerably more holding power on the part of the shock absorber for smaller movements of the axle to either side of its normal position than if the riding comfort of the vehicle body were the only objective.

For these reasons the first mentioned cycle of operation of the shock absorber should be modified so that when the axle is returned to its normal position from either of its extreme positions, it should not exert a resistance which diminishes in direct proportion with the movement, but should rather offer a resistance somewhat less than this at the beginning of the movement, and a substantially greater resistance than this as the axle nears its normal position. For the same reasons earlier mentioned in connection with the cycle first defined, the holding power of the shock absorber should be independent of the velocity of the action, and should further be unaffected by temperature.

Figures 2, 3:
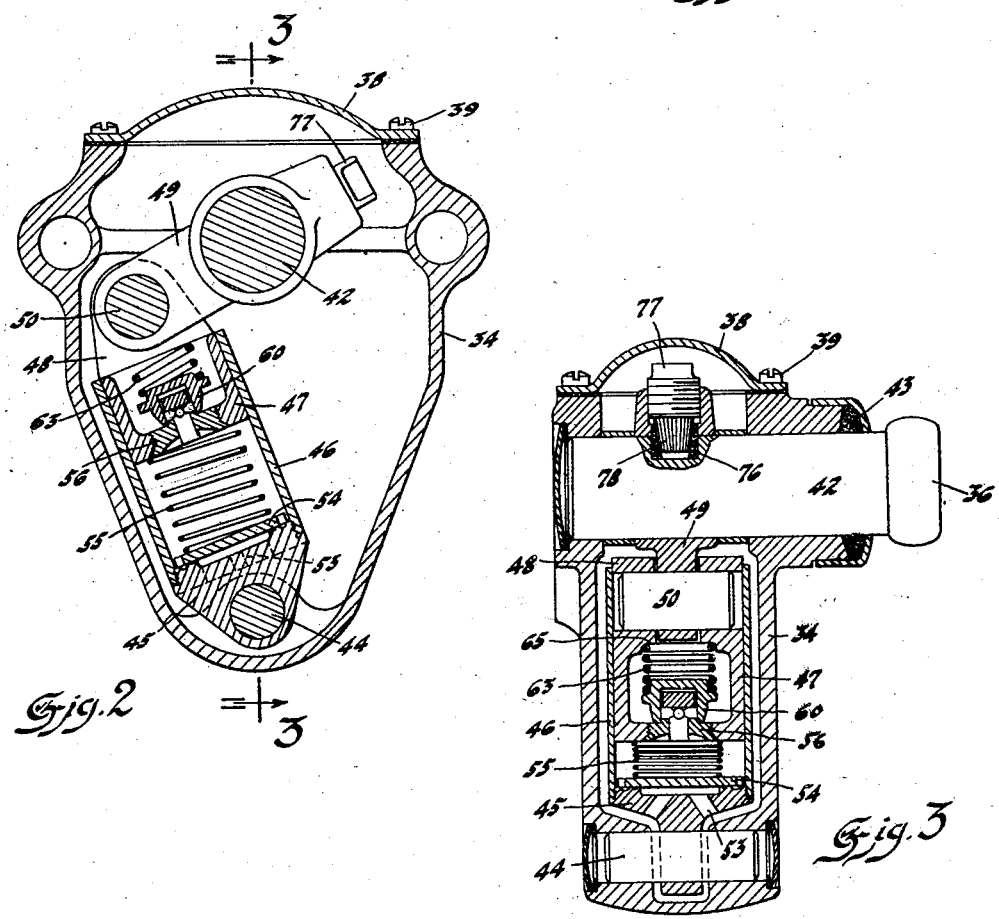
Fig. 2 is a sectional side view of the device shown in Fig. 1 which embodies certain features of the invention and in which the working elements are shown in one of their extreme positions of movement.
Fig. 3 is a section along the line 3—3 of Fig. 2 in which the moving elements of the device are shown in their neutral position.

Referring to the drawings and particularly to Figs. 1 to 3 inclusive, in Fig. 1 is shown a typical installation of a shock absorber on a motor vehicle having a frame 30 and axle 31 connected to the frame 30 by a leaf spring 32 and shackle 33. The shock absorber casing 34 may be secured to the frame 30 by bolts such as 35 or other suitable means. The operating arm 36 of the shock absorber is connected by a conventional link 37 to the spring 32 adjacent the point where the spring is connected to the axle 31, or the link may be connected directly to the axle 31. Referring to Figs. 2 and 3 it will be seen that the casing 34 is of hollow construction having an open top closed by a cap 38 suitably secured to the casing 34 by screws 39 or other suitable means. Within the casing 34 and adjacent the top thereof is suitably journalled a transverse shaft 42, one end of which projects out from the casing 34 and to the outer end of which is non-rotatably secured the operating arm 36. Suitable packing such as 43 is preferably provided for preventing leakage of the operating fluid from the casing 34 around the shaft 42. At the bottom of the casing 34 a pin 44 is provided in axially parallel relationship with respect to the shaft 42, and pivotally mounted on the pin 44 is the head 45 for the cylinder 46 which extends upwardly into the casing. Within the cylinder 46 is slidably received a piston 47 having a pair of upwardly projecting spaced lugs or arms 48. An arm 49 non-rotatably secured to the shaft 42 is pivotally connected at its free end to the lugs or arms 48 by a pin 50 whose axis lies in parallel relationship with respect to the shaft 42 and the pin 44. The head 45 is provided with openings 53 connecting the interior of the cylinder 46 with the lower part of the casing, and the opening 53 is normally closed by the disc valve 54 which is constantly urged against its seat by the coil spring 55 constantly held under compression between the valve 54 and the piston 47.

Referring now to Figs. 8 and 9 which show the construction of the outlet valve to the cylinder in detail, it will be observed that the piston 47 is provided with a central plug 56 having an upwardly projecting boss portion 57 which extends up into the interior of the piston. The plug 56 is provided with an axial opening 58 which extends up into the boss 57 where it connects with cross passages 59 which extend through the boss portion 57 above the upper surface of the end wall of the piston 47. The boss portion 57 is surrounded by an inverted cup-shaped valve member 60 which is urged downwardly to cover the cross passages 59 by means of a coil spring 63 constantly held under compression between the flange 64 on the cup 60 and the shoulders 65 on the inner side of the arms 48 as indicated in Fig. 3. When the cup member 60 is in position to fully close the cross passages 59 and therefore the escape of liquid from the cylinder 46, there is a small amount of clearance left between the end of the boss 57 and the inner end wall of the cup 60 so that the edge of the cup will at all times seat against the face of the plug 56 when the valve is in closed position. A plurality of axially extending grooves 66 formed in the circumference of the boss 57 to convey the static pressure from the cylinder to the closed end of the cup. The same effect may be obtained without the grooves by increasing the clearance between the boss 57 and the cup 60. When the device is in its neutral position, as illustrated in Fig. 3 the axes of the shaft 42 and pins 44 and 50 all lie in the same plane or, as indicated in the drawings, in vertical alignment. In such a position of the parts the vehicle spring 32 is in its normal position, that is, under tension of the static load of that portion of the vehicle weight which it supports, and the arm 36 is at substantially 90 degrees with respect to the axis of the arm 49. It will be apparent at this point that it makes no difference which way the arm 36 extends from the casing 34; that is, either forwardly or rearwardly. The casing 34 is, of course, filled with a suitable operating fluid, which may be an oil, glycerine or any other suitable liquid, to a point preferably above the top of the cylinder 46.

In operation, when the spring 32 is being either compressed or distended from its normal position shown, the arm 49 is moved through the link 37, arm 36 and shaft 42 to rotate either to one side or the other of its neutral vertical position in the casing, causing the cylinder 46 to rock about the axis of the pin 44 and the piston to move away from the cylinder head 45. This movement of the piston causes a suction within the cylinder 46 which lifts the valve 54 from its seat and draws liquid into the cylinder 46 through the openings 53, the resistance offered by the valve 54 to thus drawing in the liquid being substantially negligible. Thus the movement of the shock absorber parts, while the spring 32 is being either compressed or distended from its neutral position, offers substantially no resistance to such movement of the spring. When, however, the spring 32 and axle 31 return from either direction toward their normal position, the piston is moved toward the cylinder head and the inlet valve being closed, the liquid within the cylinder is put under pressure which instantly rises to a point where its pressure against the inner surface of the closed end of the cup 60 is great enough to cause it to compress the outlet valve spring 63 and raise the end of said cup from engagement with the upper surface of the plug 56 and uncover the passages 59. When this happens the liquid within the cylinder 46 flows through the passage 58 and out through the transverse passages 59 to the interior of the piston 47 where it freely escapes back into the casing 34. It will, of course, be apparent that the cup valve 60 will move only high enough under pressure within the cylinder 46 so that by restricting the escape of liquid through the passages 59 the pressure of the liquid within the cylinder 46 will be maintained at a substantially constant value. At the same time the passages 58 and 59 are large enough to permit any rate of flow of the liquid through them that may be met during normal operation of a motor vehicle without causing temporary increase in the pressure on the liquid within the cylinder 46 due to being restricted in its flow through such passages.

The discharge valve shown in detail in Figs. 8 and 9 is designed to eliminate any possibility of the liquid forced through it from substantially reacting against the cup valve 60 with a velocity effect and thereby cause an added increase in pressure acting against the spring 63. It will be obvious that if the flow of liquid from the cylinder 46 through the opening 58 were allowed to impinge directly against the closed end of the cup 60 at relative high velocity the kinetic energy of its flow would be added to the static pressure imparted to it by the piston 47 in its downward movement to raise the cup 60 to a greater extent than the pressure of the liquid itself would raise it. In such a case the effective pressure within the cylinder 46 would be less than that constant pressure which it is desired to maintain within the same. In the construction shown the flow of liquid up through the opening 58 impinges against the upper walls of the cross passages 59 in the boss 57, and therefore all the reaction of the flow is transmitted directly to the piston 47, and the only flow against the cup 60 is a lateral flow against the lower edges thereof when the passages 59 are not completely opened by the valve 60 and this lateral reaction does not, of course, affect the axial pressure on the spring 63 to any appreciable extent. The grooves 66 being outside the direct path of flow of such liquid through the opening 58 do not permit any appreciable reaction of the flow against the closed end of the cup 60, although they do convey the static pressure from the cylinder to the closed end of the cup 60.

Inasmuch as the pressure of the liquid against the piston remains constant during the discharge stroke, the resistance offered by the shock absorber at the end of its arm 36 to the relative movement between the car body and the axle is, at any point, a simple function of the liquid pressure upon the piston multiplied by the ratio of the effective length of the arm 49 to the effective length of the arm 36. It will be apparent that as the arm 49 rotates from its extreme position shown in Fig. 2 to its neutral position shown in Fig. 3, the effective length of its lever arm 49 changes from a maximum to zero. It can be readily demonstrated through a simple computation that the holding power of this shock absorber is substantially in proportion to the unbalanced force of the vehicle spring on the body at all points of its recoil movement from its maximum state of compression back to normal position, or from its maximum state of distention back to normal position.

Figure 6:
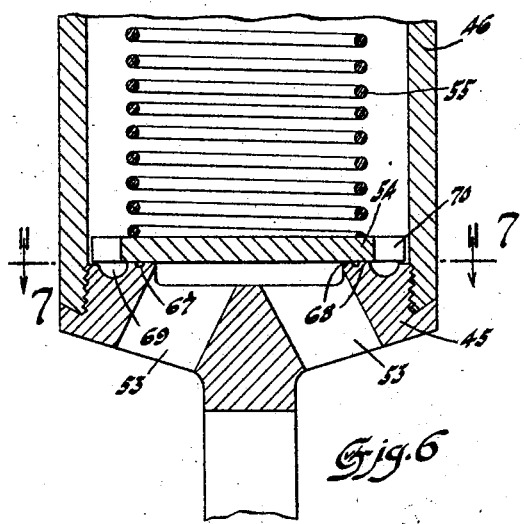
Fig. 6 is an enlarged fragmentary sectional view taken through the axis of the inlet valve for the shock absorber shown in Figs. 2 and 3.
Figure 7:
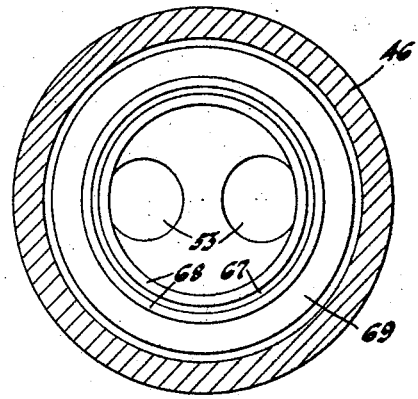
Fig. 7 is an enlarged plan view of the inlet valve seat taken as on the line 7—7 of Fig. 6.

It is important to note at this point the specific details of the inlet valve shown in Figs. 2 and 3 and which are shown in an enlarged view in Figs. 6 and 7. The upper surface of the cylinder head 45 radially outwardly of the head from the openings 53 is provided with a pair of upstanding spaced annular seats 68 separated by a groove 67. The upper edges of the seats 68 lie in the same horizontal plane as viewed in Fig. 6 and are preferably of narrow construction, and immediately outwardly of the outer seats 68 is a relatively deep annular groove 69. The disc valve 54 rests against the seat 68 and its edges outwardly of the outer seat 68 are provided with a plurality of marginal slots 70 overlying the groove 69.

In operation, it will be apparent that as the piston 47 moves on its suction stroke, the suction within the cylinder 46 will cause the valve 54 to raise against the pressure of the spring 55 and the liquid in the casing 34 will flow up through the openings 53 out over the seat 68 into the groove 69 and then upwardly through the slots 70 into the interior of the cylinder 46. Experience has shown that if but a single narrow seat is employed for the valve 54, the seat becomes pitted in due time because of impurities in the liquid, and thereby reduces the efficiency of the valve which becomes apparent on the pressure stroke of the piston. In this construction, however, in the event that one of the seats 68 becomes pitted, which would otherwise permit leakage at this point, the valve still remains tight due to its contact with the other seat. In event that both of the seats 68, or more where more are employed as may be found desirable, become pitted, the high velocity of the leakage at a point on the outer seat is checked in the groove 67 from whence the leaking liquid must necessarily have to find its way to a leakage point on the next seat. This arduous course which the leaking liquid must pursue greatly obstructs its progress and renders this type of construction much more efficient than the single seat type of valve.

It may also be noted at this point that by employing the spring 55 compressed between the piston 47 and the valve 54 instead of the usual type of inlet valve provided with a stem slidably extending through its center, a cheaper and much more efficient construction results inasmuch as such pin need not be provided, which eliminates the labor involved in its assembly and also eliminates any possible leakage which may occur between the pin and the valve where such are employed.

Figure 16:
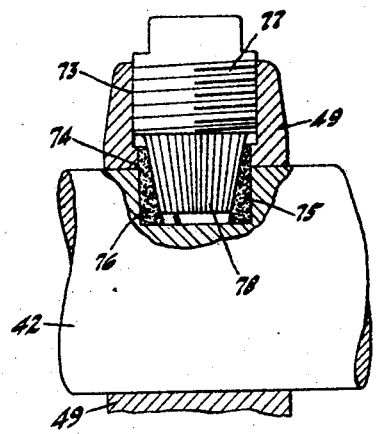
Fig. 16 is an enlarged partially broken view showing a preferred form of connection between the operating arm and co-operating shaft.
Figure 17:
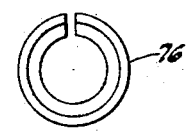
Fig. 17 is a plan view of the split sleeve employed in the connection shown in Fig. 16.

Another feature of the present invention of particular importance is the means which I employ for securing the arm 49 to the shaft 42. As indicated in detail in Figs. 16 and 17 the arm 49 is provided with a threaded opening 73 extending radially with respect to the shaft 42 and only part way into the arm 49. From the opening 73 a smooth walled opening 74 extends to the surface of the shaft 42 and in axial alignment with the opening 73. The opening 74 is continued within the shaft 42 by a smooth walled opening 75 of equal diameter. Received within the openings 74 and 75 is a split cylindrical sleeve 76 having an axially tapered inner surface. A plug 77 is threaded into the opening 73 and is provided with a tapered end 78 which is received within the tapered bore of the sleeve 76. It will be apparent that as the plug 77 is screwed inwardly the tapered end will be forced into the sleeve 76 and will cause it to spread so as to bear around its entire outer surface against the walls of the openings 74 and 75. This forms in effect a solid pin connecting the arm 49 to the shaft 42. The tapered end 78 of the plug 77 is preferably serrated so as to insure the sleeve 76 turning with the plug 77 and thus eliminate any possibility of the sleeve 76 freezing in the openings 74 and 75 and prevent ready disassembly of the arm and shaft. It may be noted that the conventional form of attachment of these parts consists of a stud threaded into the arm and having a tapered end directly engaging the walls of a tapered recess in the shaft. Such form of connection is satisfactory for a shock absorber acting one way only, but inasmuch as it is impossible in production to eliminate entirely all the play between the threaded stud and the threaded opening, when such construction is employed in a shock absorber acting two ways, the stud soon becomes loose in the arm and an undesirable play develops which is detrimental to the action of the shock absorber. With the construction shown and herein described all reliance on the threaded portion of the stud tending to resist relative rotation between the arm and shaft is dispensed with and instead such load is taken care of through the split sleeve 76 whose close engagement with the smooth walls of the openings 74 and 75 is assured.

Figure 4:
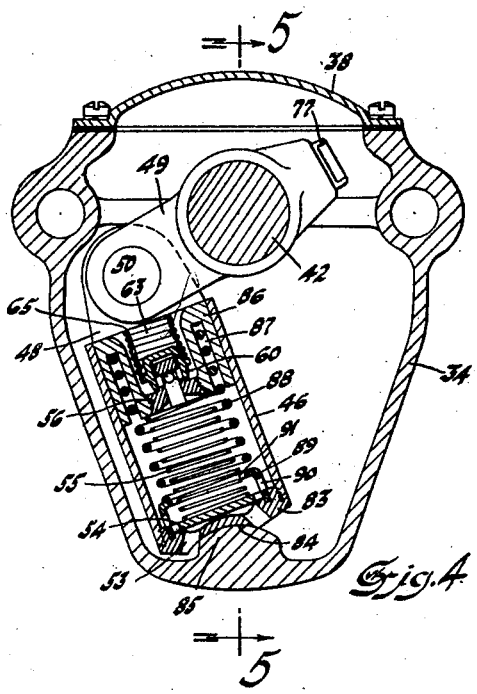
Fig. 4 is a sectional side view of a shock absorber showing another embodiment of the invention in which the working elements are shown in one of their extreme positions of movement.
Figure 5:
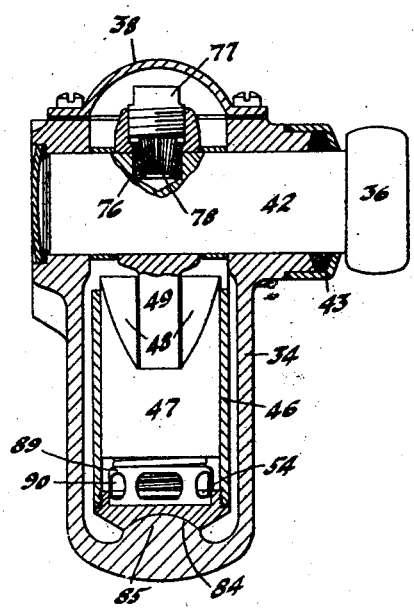
Fig. 5 is a section of the line 5—5 of Fig. 4 in which the working elements are shown in their neutral positions.

In Figs. 4 and 5 a slight modification of the construction in Figs. 2 and 3 is shown. The cylinder 46 in this case is provided with a head 83 which is formed to provide on its lower surface a spherical seat 84. The bottom of the casing 34 is provided with an upstanding projection 85 the upper surface of which is formed to the shape of a part of a surface of a sphere, and the surface 84 of the cylinder head 83 is adapted to slidably bear thereon. A modified form of piston 86 is preferably employed in this construction and is provided with an annular upwardly extending recess 87 in which one end of the spring 88 is received, the spring 88 being constantly held under compression between the blind end of the recess 87 and a seat member 89 carried by the head 83 and projecting above it. The seat member 89 is provided with openings 90 in its side walls for the ready passage of the operating fluid and is provided with a central opening 91 for the passage of the spring 55 which holds the valve 54 on its seat. The remainder of the construction is substantially identical to that previously described in connection with Figs. 2 and 3 and it will, of course, be apparent that the action is identical. The spring 88 maintains the cylinder head 83 in contact with the boss 85 and the cylinder 46 slides over the surface of the boss 85 about the circular center of the same in the same manner as the cylinder 46 in Figs. 2 and 3 pivots about the axis of the pin 44.

It will be readily apparent that the construction shown in Figs. 4 and 5, as well as the constructions shown in Figs. 2 and 3, may be reversed with respect to the cylinder and piston; that is, the piston may be secured for swinging movement only, and the cylinder may be secured for movement with the arm 49, without affecting the action of the device in any way whatsoever. It will also be apparent that the relative positions of the inlet and outlet valves may be reversed without affecting the operation of the device, although it is preferable to have the inlet valve adjacent the bottom of the casing rather than adjacent the top, for the reason that there is less possibility of drawing air bubbles into the cylinder 46. It is also apparent that other inversions of members such as securing the shaft 42 to the frame member of the vehicle and oscillating the casing 34 by means of an arm rigidly attached to it will not depart from the principles of this invention.

Figure 13:
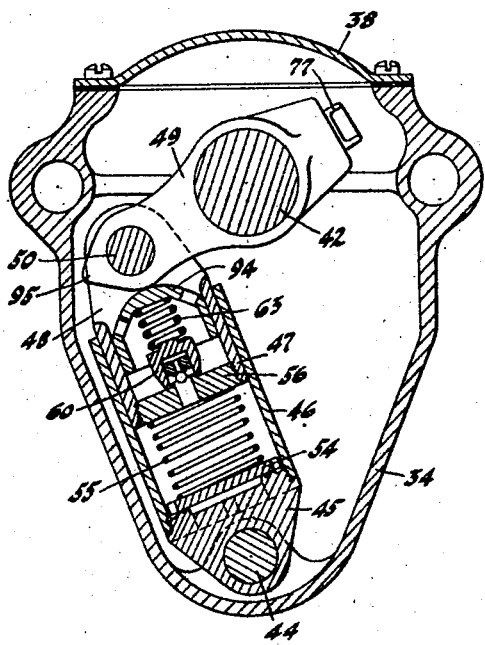
Fig. 13 is a view similar to Fig. 4 but showing a modified arm construction in which the arm co-operates with the spring for the discharge valve whereby to control the tension of the same to produce predetermined pressures within the cylinder varying in accordance with the position of the vehicle axle relative to its frame.

In the devices above described in connection with the drawings, the construction has been such as to maintain a constant pressure within the cylinder 46 during all phases of the relative movement between it and the piston 47. However, it may be desirable in some cases to have a greater pressure in the cylinder during certain phases of the movement between the vehicle axle and the body than at other times, and in Figs. 13 to 15 inclusive I show means where this may be readily and automatically accomplished. As indicated in Fig. 13 the spring 63, instead of being compressed between the shoulders 65 and the end wall of the piston 47, is held under compression between the end wall of a cup 94 and the end wall of the piston 47, the cup 94 being axially slidably received within the piston 47. The spring 63 forces the cup 94 against the adjacent end of the arm 49 and its axial position and consequently the tension of the spring 63 is controlled by the particular configuration of the end of the arm which the end of the cup contacts with during swinging of the arm 49. In the construction shown in Fig. 13 the arm 49 is provided with an extended or projecting cam surface 95 in alignment with the axis of the arm 49. The result is, as will readily be apparent, that when the axes of the pins 44, 50 and shaft 42 are in alignment the cup 94 will be moved to its closed position with respect to the end wall of the piston 47, and the spring 63 will be in its position of maximum compression. In such a position of the parts the cup valve 60 will be urged against its seat with a greater force than at any other point in the travel of the parts, and accordingly a greater pressure will be exerted on the liquid in the cylinder as the parts approach their neutral position. The holding force of the shock absorber will therefore increase as the parts move toward their neutral position with this construction.

Figure 14:
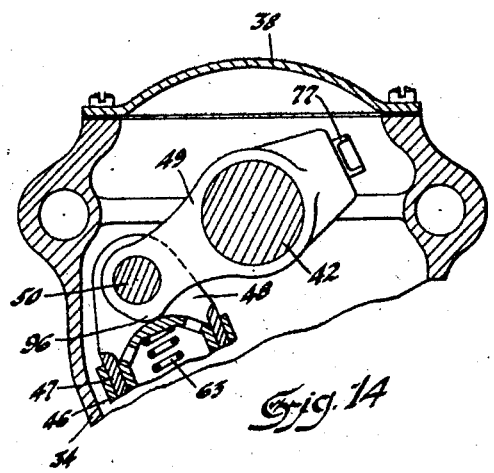
Figs. 14 and 15 illustrate modifications of the construction shown in Fig. 13.
Figure 15:
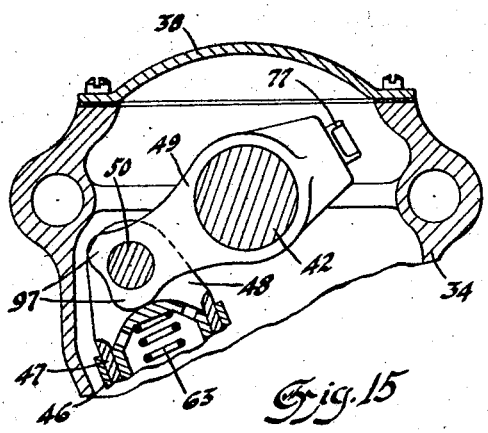

It will be apparent that the position of the cam-like projection on the arm 49 may be varied with respect to the end of the arm 49 so as to obtain a maximum pressure in the cylinder 46, and therefore a maximum holding power of the shock absorber at any particular point in the movement of the same. For instance, it may be desired to have the shock absorber exert its maximum holding power at or about the time the vehicle spring begins to return from fully distended position. In such a case a projection 96 may be formed on the end of the arm 49 as indicated in Fig. 14 so that at this one particular point in the movement of the shock absorber, the pressure of the spring 63 and consequently the pressure that may be built up within the cylinder 46 is of maximum value. On the other hand it may be desired to have the shock absorber exerting a maximum holding power approximately midway between its maximum movement in either direction and its neutral position, and it will be apparent that in such case a pair of projections such as is indicated at 97 in Fig. 15 may be provided on the end of the arm 49 to effect this result. It will also be apparent that the value of the holding power of the shock absorber at any particular point of its travel may be varied by the height or extent to which the projections on the end of the arm 49 project therefrom.

In Figs. 11 and 12 I show modified forms of the discharge valve, the actions of which are substantially the same as that described in connections with the construction shown in Fig. 8. In Fig. 11 the boss 57 instead of being provided with the grooves 66 in its outer surface as in the construction shown in Fig. 8, is provided with a relatively small central opening 98. The opening 98 is small enough to prevent any material reaction of the jet of liquid passing through the opening 58 from impinging against the closed end of the cup valve 60 and reacting against such closed end in addition to the static pressure of the liquid.

The same result is accomplished in a slightly different way in the construction shown in Fig. 12. In this case a cup valve member 99 of slightly different construction is employed as shown. The boss 57 is provided in its upper end with an enlarged recess 100 which is connected to the passages 58 and 59 by a small opening 101. The cup valve 99 has secured thereto an axially inwardly extending piston member 102 which is slidably received within the recess 100. The pressure of the liquid in the cylinder 46 is transmitted through the openings 58 and 101 to the recess 100 where it reacts against the end of the piston 102 to move the valve 99 from its seat to uncover the passages 59. The particular advantage of this construction is that a lighter spring 63 may be employed for urging the cup valve 99 toward its closed position than in the constructions previously described. In this construction a small opening 103 is provided in the end wall of the valve member 99 to relieve the pressure of the liquid in the space between the end of the valve 99 and the end of the boss 57. This opening, as well as the openings 98 and 66 previously described, is large enough to permit ready and relatively free movement of the cup valve member, but yet is preferably small enough to effect a dash-pot action between the valve member and the boss 57 to prevent chattering of the valve.

Figure 18:
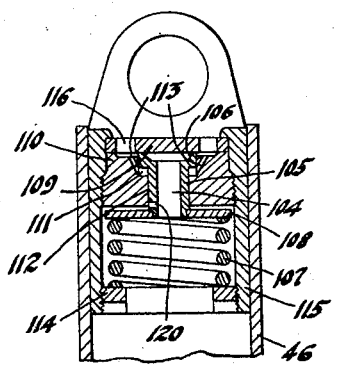
Fig. 18 is a fragmentary sectional view taken axially through a cylinder and piston showing a modified type of discharge valve in connection with the piston.

Fig. 18 shows another form of discharge valve which functions substantially the same as the valves previously described and illustrated in Figs. 8 to 12 inclusive.

Referring to Fig. 18 it will be seen that upon a downward movement of the piston 115 the pressure of the liquid in the cylinder 70 is communicated through the tubular passage 104 in the tubular valve 105 where it reacts upon its upper end 106. Since the area of the upper end 106 exposed to the pressure of the liquid is greater than the area exposed to the pressure of the liquid at the lower end of the valve, the valve will be opened in a downward direction when the pressure of the liquid on its upper end is sufficient to overcome the force of the spring 107 which bears against the lower end of the valve through the plate 108 and urges the valve towards closed position. Upon such opening of the valve the liquid is allowed to escape between the valve seat member 109 and the sharp annular edge of the valve and thence through the ports 116 in the members 109. It will be noted that the high velocity jet of liquid issuing through the passage 104 when the valve is open impinges upon the stationary valve seat 109 which is rigidly secured to the piston 115, and therefore does not react upon the valve 105 in such a manner as to add an additional force to the static pressure of the liquid which is then keeping the valve open.

It will be further noted that the upper end of the valve guide member 110 is formed with a cylindrical recess 111 into which the annular extension 106 of the upper end of the valve 105 slidably fits. This recess 111 is deep enough to allow a clearance under the enlarged head of the valve at all times. Any pressure which might tend to build up in the recess 11 below the head of the valve through leakage of liquid between the cylindrical valve stem and its guide 111 is relieved by means of small ducts 113 extending from the bottom of the recess 111 to adjacent the ports 116.

It will be further noted that the cylindrical opening at the upper end of the valve seat 110 into which the annular extension of the upper end of the valve 105 is fitted, acts as an effective dash pot which prevents the valve from chattering. In this construction the lower end of the valve spring 107 is shown seated against an annular ring 114 which is screwed tightly into piston 115.

Figure 19:
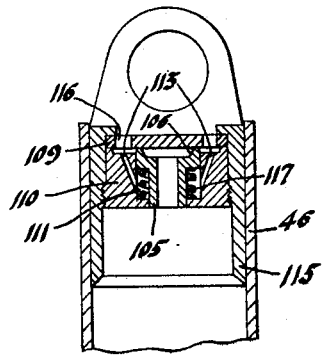
Fig. 19 is a view similar to Fig. 18 and showing a slight modification thereof.

In Fig. 19 I show another construction of the same type of valve as is shown in Fig. 18. This valve functions in substantially the same manner as the valve shown in Fig. 18 and the principal difference in construction is that the recess 111 is made deeper in this case and a spring 117 is held in compressed condition between the lower face of the enlarged head 106 of the valve and the bottom wall of the recess 111.

Figure 20:
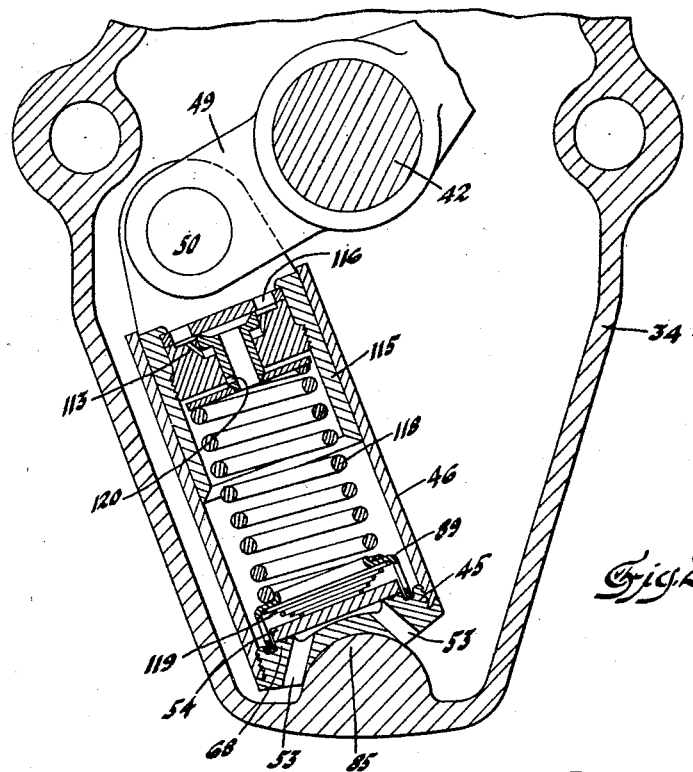
Fig. 20 is a sectional view taken axially through a cylinder and piston and shows a modified control means for the discharge valve.

In Fig. 20 I show a valve construction which functions substantially the same as the ones shown in Figs. 18 and 19, except for the fact that the valve spring 118 which urges the discharge valve to a closed position exerts a variable instead of a fixed pressure upon the valve. The lower end of the spring 118 bears against the holding ring 89 which is seated against the cylinder bottom 45. It will be readily seen that as the piston 115 moves downwardly in the cylinder 45 the spring 118 becomes further compressed, thus establishing an increasing pressure of the liquid in the cylinder as the piston 19 moves downwardly during its discharge stroke. In connection with the cylinder bottom 45 are shown the inlet passages 53, inlet valve seats 68, a disc type inlet valve 54, and an inlet valve spring 119. This inlet valve is constructed substantially the same as that shown in Figs. 4 and 5. With these last described discharge valve constructions a duct 120 is formed in the valve 105 at the lower edge of the guide member 110 to permit the escape of any air that might otherwise become trapped under the guide 110 and above the lower end of the valve.

To summarize, it will be apparent that with a shock absorber constructed in accordance with the present invention substantially no resistance is offered by it when the vehicle spring is either being compressed or distended from its normal position, and therefore does not add to the unbalanced forces acting on the ends of the spring at such times, but that it does resist the movement of the spring from either its compressed or distended position back to its normal position and acts against the unbalanced forces at the ends of the spring at such time. It will also be apparent that when the shock absorber is resisting the action of the spring its holding power may be controlled by suitable design of the parts as described to exert a predetermined value regardless of the velocity of discharge or the viscosity of the liquid in the device or the temperature of the liquid. It will also be apparent that by employing the oscillating cylinder as described, substantially no lateral pressure is exerted by the piston on the walls of the cylinder as is true of so many conventional forms of hydraulic shock absorbers which are subject to relatively rapid wear due to the same.

Formal changes may be made in the specific embodiment of the invention described without departing from the spirit or substance of the broad invention, the scope of which is commensurate with the appended claims.

What I claim is:

1. A hydraulic shock absorber comprising, in combination, a liquid containing casing, a rock shaft journaled in said casing, a cylinder within said casing oscillatable about a line parallel to said rock shaft, an arm secured to said rock shaft, a piston in said cylinder pivotally connected to said arm, the pivotal axis of the connection between said arm and piston lying in a plane common to the axis of said rock shaft and the pivotal axis of said cylinder when said shock absorber is in neutral position, an inlet valve for said cylinder, and a spring controlled outlet valve for said cylinder through said piston, said outlet valve being so constructed as to obviate velocity effects and adapted to maintain a predetermined pressure in said cylinder during discharge of liquid therefrom at any point in the path of travel of said piston and also to remain substantially unaffected by changes in the rate of discharge of said liquid from said cylinder or in the viscosity of said liquid.

2. In combination with a pressure cylinder, a cylindrical projection extending outwardly from a wall subjected to the pressure within said cylinder, said projection being provided with a passageway therein opening onto a side wall thereof and connected with the interior of said cylinder, a sleeve fitting over said projection for closing said passageway to the flow of fluid, means constantly urging said sleeve to passage closing position, said projection being provided with a cylindrical recess in the outer end thereof the inner end of which is in open communication with said passageway through a relatively small opening, a piston carried by said sleeve slidably received in said recess whereby the pressure transmitted to its face from the fluid in said passageway will act to move said sleeve to uncover said passageway, and the end of said sleeve being closed over the end of said projection whereby to form a dash pot to prevent chattering of said sleeve.

3. In a hydraulic shock absorber, in combination, a liquid containing casing, an oscillating cylinder, a reciprocating piston in said cylinder, a rock shaft journaled in said casing, an arm secured to said rock shaft, said arm being pivotally connected to said piston, an inlet valve for allowing the liquid to flow freely into the cylinder but preventing flow in the opposite direction, an outlet passage with a spring controlled outlet valve in said piston, and means for automatically varying the pressure of said outlet valve spring upon said outlet valve in relation to the position of said arm with respect to said casing.

4. In a hydraulic shock absorber, in combination, a liquid containing casing, an oscillating cylinder therein, a piston reciprocable in said cylinder, a rock shaft journaled in said casing, an arm secured to said rock shaft and pivotally connected to said piston, an inlet valve for permitting flow of fluid into said cylinder, an outlet passage in said piston, a valve for said passage, and a spring held under compression between said arm and the last mentioned valve for constantly urging said last mentioned valve toward closed position.

5. In a hydraulic shock absorber, in combination, a liquid containing casing, an oscillating cylinder therein, a piston reciprocable in said cylinder, a rock shaft journaled in said casing, an arm secured to said rock shaft and pivotally connected to said piston, an inlet valve for permitting flow of fluid into said cylinder, an outlet passage in said piston, a valve for said passage, and a spring held under compression between said arm and the last mentioned valve for constantly urging said last mentioned valve toward closed position, the surface of said arm against which said spring is adapted to bear being formed to a cam-like shape whereby the pressure of said spring on said last mentioned valve will vary in accordance with the angle between the axis of said piston and the longitudinal axis of said arm.

6. A discharge valve for a pressure chamber having an opening in a wall thereof comprising, in combination, a tubular member slidably received in said opening, said tubular member being provided with a radially outwardly extending flange at its outer end, a surface fixed with respect to said wall on the outer side of said chamber, and spring means constantly urging said flange against said fixed surface whereby to close said tubular member to the flow of fluid therethrough, the end surface of said flange being shaped to be acted upon by the pressure within said chamber in opposition to said spring means.

7. In combination with a pressure chamber having an opening through a wall thereof, said opening being provided with a cylindrical enlargement at its outer end, a valve member slidably fitting in said opening and provided with an outwardly flanged end slidably fitting in said cylindrical enlargement, a valve seat member fixed relative to said wall overlying said opening, said flanged end of said valve member being internally cut away to form an annular rim adapted to contact against said seat member, said valve member being provided with an opening therethrough for communicating the pressure within said chamber to said cut away portion of said valve member, yieldable means constantly urging said annular rim towards contact with said valve seat member, and means for relieving any pressure that may tend to build up in said enlargement between the bottom thereof and said flanged end.

8. In combination, a pair of relatively movable members cooperating to establish a pressure chamber of variable volume, one of said members being provided with an opening therethrough, a valve member cooperating with said opening to control the escape of fluid from said chamber through said opening, and a spring constantly urging said valve member towards closed position, one end of said spring co-operating with said valve member and the other end of said spring being movable with the other of said relatively movable members whereby the pressure of said spring acting against said valve member will vary during relative movement between said relatively movable members and thereby establish a pressure in said chamber varying inversely as the volume thereof.

9. In combination with the frame, axle and springs of a motor vehicle, a shock absorber operatively connected between said frame and axle comprising a liquid containing casing, a pair of relatively movable members therein co-operating to form a pressure chamber of varying volume, said members arranged to effect an increase of volume of said chamber upon movement of said axle to either side of its normal position and a decrease of volume of said chamber upon return of said axle to its normal position, means for admitting liquid to said chamber upon increase of volume thereof without exerting a substantial resistance of the flow of said liquid, and means for resisting the escape of liquid from said chamber upon decrease of volume thereof, the resisting effect of the last mentioned means varying inversely as the volume of said chamber and being independent of the rate of discharge of said liquid from said chamber.

AXEL W. KOGSTROM.